United States Patent [19]

Suonvieri

[11] Patent Number: 5,831,974

[45] Date of Patent: Nov. 3, 1998

[54] TESTING EQUIPMENT FOR A BASE STATION NETWORK

[75] Inventor: Jukka Suonvieri, Tampere, Finland

[73] Assignee: Nokia Telecommunications Oy, Espoo, Finland

[21] Appl. No.: 676,252

[22] PCT Filed: Nov. 20, 1995

[86] PCT No.: PCT/FI95/00639

§ 371 Date: Sep. 20, 1996

§ 102(e) Date: Sep. 20, 1996

[87] PCT Pub. No.: WO96/16522

PCT Pub. Date: May 30, 1996

[30] Foreign Application Priority Data

Nov. 21, 1994 [FI] Finland .................................. 945468

[51] Int. Cl.⁶ .............................. H04Q 7/34; H04B 17/00
[52] U.S. Cl. ......................... 370/252; 370/337; 370/347; 370/350; 455/67.4
[58] Field of Search .................................... 370/313, 314, 370/328, 336, 337, 345, 347, 252, 246, 350, 519, 249; 455/67.8, 226.1, 423, 456, 517, 508, 67.4, 524, 67.1

[56] References Cited

U.S. PATENT DOCUMENTS

| | | | |
|---|---|---|---|
| 3,350,644 | 10/1967 | McNair | 370/356 |
| 5,278,832 | 1/1994 | Binzel et al. | 370/347 |
| 5,363,375 | 11/1994 | Chuang et al. | 370/332 |
| 5,471,649 | 11/1995 | Rees et al. | 455/67.4 |
| 5,483,537 | 1/1996 | Dupuy | 370/337 |
| 5,544,171 | 8/1996 | Godecker | 370/337 |
| 5,654,960 | 8/1997 | Kohlschmidt | 370/337 |

FOREIGN PATENT DOCUMENTS

| | | |
|---|---|---|
| 630 125 | 12/1994 | European Pat. Off. . |
| 2 277 232 | 10/1994 | United Kingdom . |
| 91/15904 | 10/1991 | WIPO . |
| 95/02306 | 1/1995 | WIPO . |

Primary Examiner—Douglas W. Olms
Assistant Examiner—Seema S. Rao
Attorney, Agent, or Firm—IP Group of Pillsbury Madison & Sutro LLP

[57] ABSTRACT

A testing equipment for a base station in a time division multiple access radio system employing timing advance is located at one base station site under control of a respective base station to perform test procedures on base stations. The testing equipment simulates the operation of a normal mobile station on the radio path, in test procedures. In contract to known systems, in which the maximum distance between the testing equipment and a base station to be tested is determined by the maximum value of a timing advance, the present testing equipment provides a preset timing advance offset ($TD_{OFFSET}$), which shifts the normal timing advance range ($TD_{NORMAL}$) in such a manner that the testing equipment is also capable of testing base stations the distance of which from the testing equipments is further than the maximum distance that would be determined by the maximum value of a normal timing advance.

11 Claims, 3 Drawing Sheets

TESTING EQUIPMENT FOR A BASE STATION NETWORK

This application claim benefit of international application PCT F195/00639, filed Nov. 20, 1995

FILED OF THE INVENTION

The present invention relates to a testing equipment for a base station network in a time division multiple access (TDMA) radio system employing timing advance control, in which a maximum value defined for a timing advance determines a maximum distance between a base station and a mobile station, this testing equipment being located at one base station site under control of the respective base station to perform test procedures on base stations, the testing equipment simulating the operation of a normal mobile station on the radio path during the test procedures.

BACKGROUND OF INVENTION

In radio systems, for instance in cellular systems, one of the most crucial factors is the quality of the radio connection between a base station and a mobile radio station. The quality of this radio connection is essentially affected by the condition of the radio sections, i.e. the antennas and transceivers, of the base station. Therefore, it is important that the condition of a base station can be monitored by means of different measurements and tests.

In a known solution, a base station is provided with a testing equipment with a dedicated antenna and a transceiver so that it is capable of establishing a connection with the base station over the radio path, like a normal subscriber station. In addition, the testing equipment is provided with necessary measuring equipment for performing desired test measurements and test calls on the base station. A testing equipment located at one base station site can also be used for measuring neighboring base stations, whereby a dedicated testing equipment for each base station is avoided.

In digital time division multiple access (TDMA) radio systems, a number of mobile radio stations can use the same carrier wave (radio channel) on the time division principle for communicating with a base station. The carrier wave is divided into successively recurring frames, which are divided further into time slots, for instance into eight time slots, which are allocated to users as the need arises. Short data bursts are transmitted in the time slots. A mobile radio station synchronizes with a signal arriving from the base station and transmits a burst in accordance with this synchronization signal (or "sync") in such a manner that the burst of the mobile station is received at the base station in a time slot allocated to this specific mobile station. However, mobile stations may be located at different distances from the base station, it being thus necessary to synchronize the transmission moment of each mobile station with the base station, taking into account the propagation delay due to this distance in such a manner that the signal from each mobile station, regardless of its distance from the base station, is received in the correct time slot at the base station. In order to do this, the base station measures the time difference between its own transmission and the transmission received from a mobile station and determines a suitable timing advance for the mobile station on this basis. By means of this timing advance, the mobile station advances the transmission moment in relation to the basic moment provided by the sync obtained from the base station. Different factors internal to the system restrict the highest possible timing advance to a certain maximum value. This maximum value of timing advance then determines the largest cell size that a base station of the system is able to serve. For instance in the pan-European mobile communication system GSM (Global System for Mobile Communication), timing advance may be given values within a range of 0–233 $\mu$s, which is equivalent to the size of a cell with a radius of 35 km at the most.

This restriction due to timing advance also leads to the fact that a testing equipment located at one base station site cannot be used for testing neighboring base stations which are located at an excessive distance from the testing equipment, for instance at a distance of over 35 km. However, since the antennas of both a base station to be tested and the testing equipment are usually located at relatively elevated sites in a high place in terrain, overlong radio connections are in most cases possible as regards the coverage, i.e. the attenuation of the radio path and natural obstacles.

SUMMARY OF THE INVENTION

The object of the present invention is to provide a testing equipment for a base station network, which can also be used for testing base stations located at a distance longer than the maximum distance determined by timing advance.

This is achieved with the testing equipment for a base station network according to the invention, characterized in that the testing equipment comprises a preset timing advance offset, which shifts the normal timing advance range upwards in such a manner that the testing equipment is also capable of testing base stations the distance of which from the testing equipment is longer than the maximum distance which equates to a maximum normal timing advance.

The testing equipment of the invention employs a preset timing advance offset for measuring base stations located at overlong distances. To put it differently, an additional timing advance offset is preset in the transmission of the testing equipment, this timing advance offset increasing the timing advance in such a manner that the distance of a base station to be tested is compensated for even if it is located at an overlong distance from the testing equipment. Above the preset timing advance offset value, the timing advance can be adjusted within a normal range according to the control of a tested base station. In other words, the base station to be tested measures the distance of the testing equipment in a normal manner and adjusts the testing equipment to use a suitable timing advance value on this basis. Therefore, the selection of a preset timing advance offset does not need to be particularly accurate. The testing equipment modifies the timing advance command transmitted by the base station to be tested by adding the assigned timing advance to the preset timing advance offset. In an access burst, the testing equipment uses the preset timing advance offset value instead of the normal value 0. Preferably, the preset timing advance offset has the value 0 for the local area (for distances corresponding to a normal cell size) and one or more values deviating from zero for the long-distance area, i.e. for overlong distances.

BRIEF DESCRIPTION OF THE DRAWINGS

In the following, the invention will be described in more detail by means of the preferred embodiments of the invention with reference to the accompanying drawings, in which.

DETAILED DESCRIPTION OF PREFERRED EMBODIMENT OF THE INVENTION

The present invention is intended to be applied in any radio network in which digital time division multiple access (TDMA) and timing advance are applied.

Figure 1:
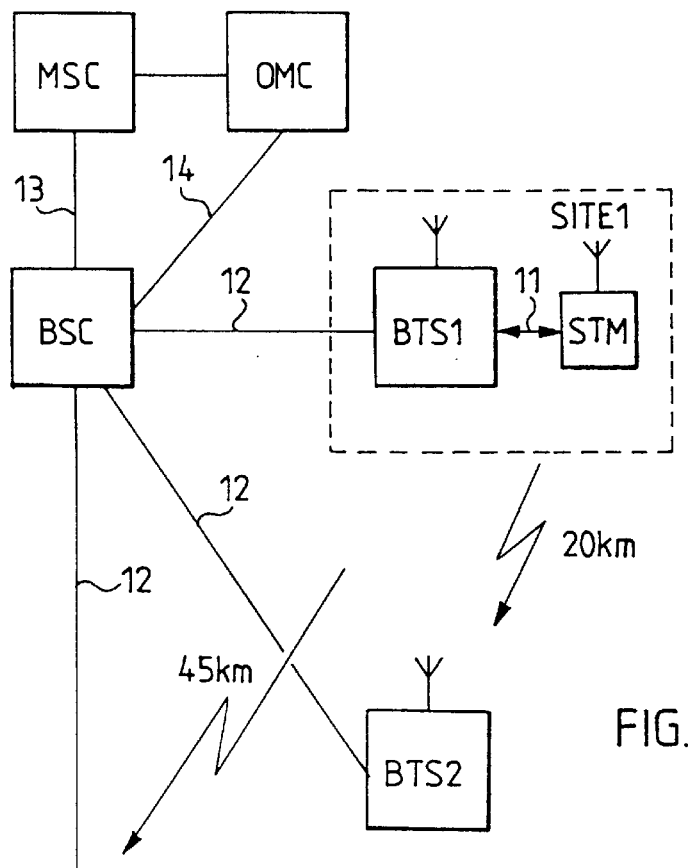
FIG. 1 shows the radio system of the invention.

FIG. 1 illustrates a radio system in which the testing equipment STM of the invention is connected by a fixed control link 11 to a base station BTS1 at a base station site SITE1. In the radio system which the base station BTS1 belongs to, the next higher-level network element is a base station controller BSC, to which the base station BTS1 is connected by a fixed digital transmission link 12, such as a PCM link. The base station controller BSC is connected to a mobile exchange MSC by a digital transmission link 13 and to an operation and maintenance center OMC controlling the operation of the entire system by a transmission link 14. From the center OMC, the radio network operator can change different parameters of the network and control the operation of the network elements, such as the base stations BTS. In addition, base stations BTS2 and BTS3 are also connected to the base station controller BSC by digital transmission links.

By means of the testing equipment located at the base station site SITE1, it is possible to test both the base station BTS1 of said base station site1 and one or more neighboring base stations one or more of which is or are located at a site that is or sites that are geographically separated from SITE1. Providing each base station of the base station network with a dedicated testing equipment can be avoided in this manner. By means of the testing equipment STM, it is possible, for instance, to establish test calls, make test calls via a desired base station, perform sensitivity and interference measurements, etc. Especially as regards test calls, the testing equipment STM must be capable of simulating the operation of a normal mobile station of the radio network on the radio path. The testing equipment can thus be implemented for instance with a conventional mobile radio station equipment, which is provided with a link 11 to a base station and the software of which is arranged to perform measurements and tests under control of that base station.

Figure 5:
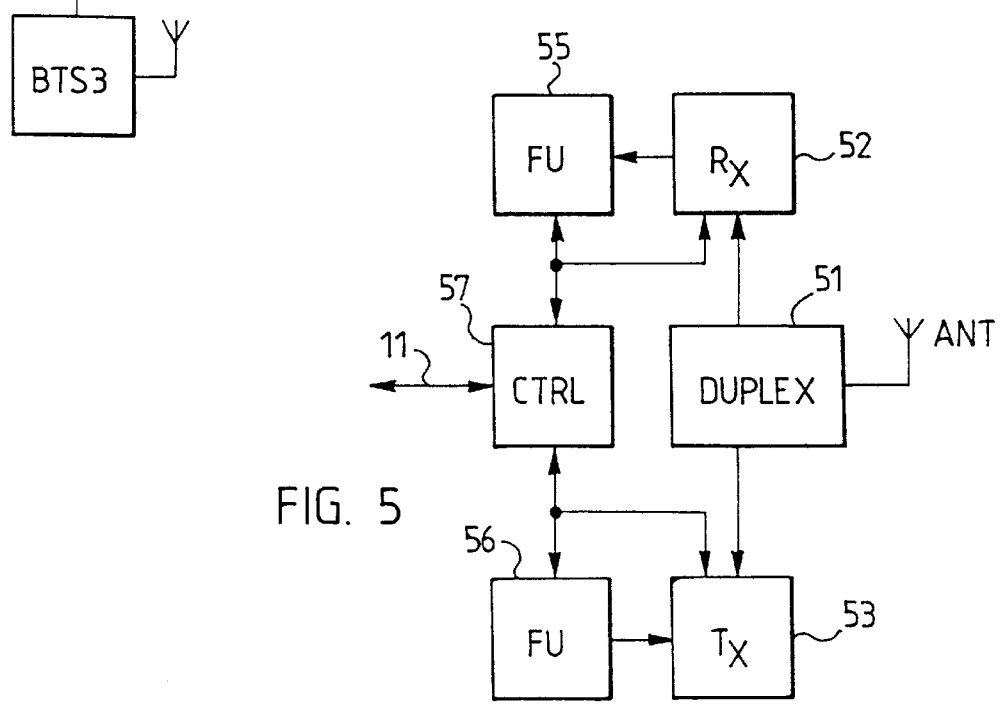
FIG. 5 is a block diagram of the testing equipment of the invention.

FIG. 5 shows a simplified block diagram of a testing equipment STM of the invention, the testing equipment being located at a base station. The block diagram shows, for the sake of simplicity, only those parts of the testing equipment which are necessary for understanding the invention. The testing equipment comprises an antenna ANT, a duplex filter 51, a receiver 52, a transmitter 53, frame units 55 and 56, and a control unit 57. The radio receiver 52 and the radio transmitter 53 contain all the radio frequency parts of the testing equipment STM. The frame units 55 and 56 contain all the baseband signal processing relating to reception and transmission, for instance channel coding, interleaving, burst establishment, etc. The control unit 57 controls the operation and timing of the testing equipment in such a manner that the testing equipment STM simulates perfectly the operation of a conventional mobile station on the radio path. The control unit 57 communicates with the base station BTS1 via the control link 11, receiving control commands and possibly transmitting measurement reports. The control unit 57 also generates all the signals relating to the timing of transmission and reception, synchronizes the transmission and reception and adjusts the necessary timing advance according to the preset of the invention and the timing advance value received from a base station to be tested over the radio path.

Figure 2:
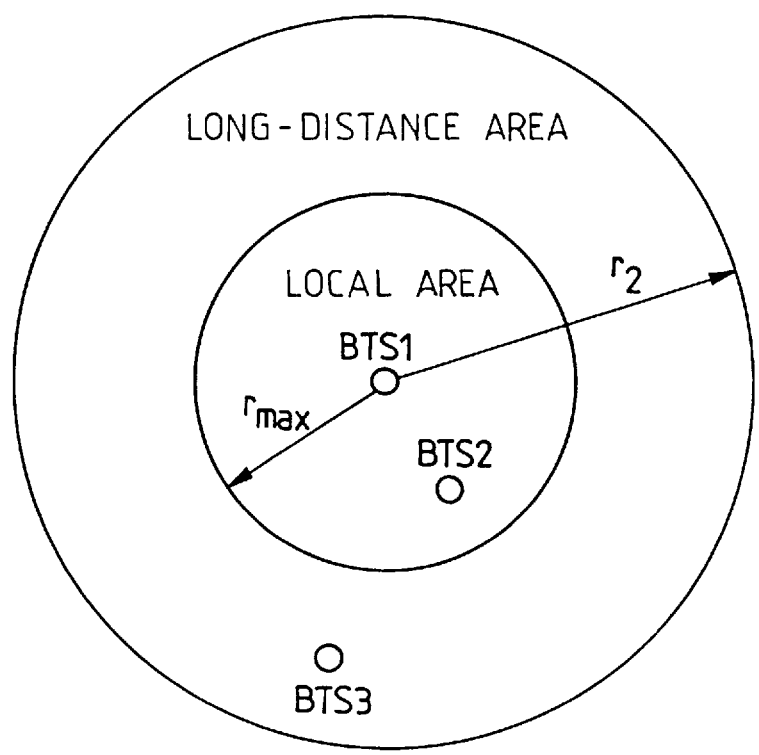
FIG. 2 illustrates the establishment of the local area and the long-distance area of the base station network measurement.

As explained above, the timing advance area used in TDMA systems determines the maximum distance $r_{max}$ between a base station BTS and a mobile station, this distance being about 35 km in the GSM system. In the present document, this normal cell size is referred to as the local area of the testing equipment. The area located beyond this maximum distance rex is referred to as the long-distance area of the testing equipment STM in this document. FIG. 2 illustrates the local and long-distance areas of the testing equipment STM located at the base station BTS1. The base station BTS2 of FIG. 1 is thus located in the local area at a distance of 20 km from the testing equipment, and it can be tested by the testing equipment using a conventional timing advance at the base station site SITE1. As for the base station BTS3, it is located in the long-distance area at a distance of 45 km from the testing equipment, and it cannot be tested with conventional means from the base station site SITE1. Thus, another testing equipment has conventionally been needed at the base station BTS3 or in a sufficiently close proximity to it.

Figure 3:
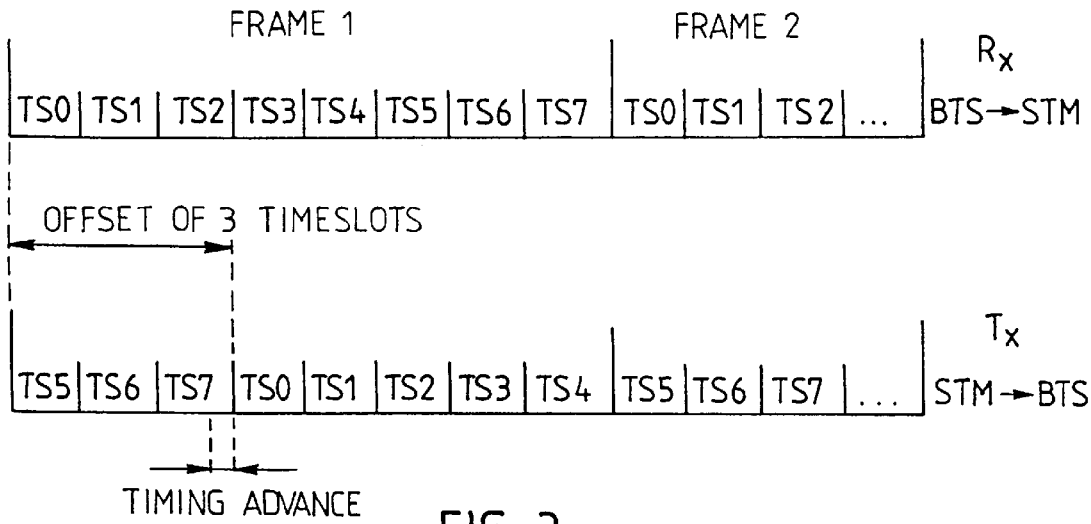
FIG. 3 illustrates the normal timing of the transmission and reception of the testing equipment in a local area.

FIG. 3 illustrates the timing of the transmission and reception of the testing equipment STM according to the specifications in testing operations taking place in the local area. Both the downlink carrier (BTS-STM) and the uplink carrier (STM-BTS) are divided into successively recurring frames, which are divided further into TDMA time slots, for instance into eight time slots TS0–TS7, which are allocated to users as the need arises. Short data bursts are transmitted in the time slots TS0–TS7. The STM synchronizes its uplink transmission Tx with the downlink signal received from the base station. The transmission Tx and the reception Rx of a conventional mobile station and of the testing equipment STM measuring a base station in the local area take place exactly as specified for the mobile station in such a manner that the STM transmits its own burst to the base station BTS with an offset OFFSET of three time slots as compared with the moment when the STM receives a burst from the base station BTS (for instance time slot TS0) Since mobile stations may be located at different distances from the base station, the transmission moment of each mobile station is synchronized with the base station in radio systems, taking into account the propagation delay due to this distance in such a manner that the signal is received in the correct time slot at the base station. In order to do this, the base station BTS measures the time difference between its own downlink transmission and the uplink transmission received from a mobile station and determines a suitable timing advance Timing Advance for the mobile station on this basis. By means of this timing advance, the mobile station advances the transmission moment in the uplink direction in relation to the basic moment provided by the sync obtained from the base station. If the STM tests the base station BTS1 of its own base station site SITE1, the distance is zero and the timing advance value is zero. If the STM tests the base station BTS2, the base station BTS2 detects this distance by measuring and provides the STM with a timing advance compensating for this distance, and the establishment of the test call can be continued in the normal manner.

The operation of the testing equipment is in accordance with what is described above when the testing equipment operates in a local measurement mode. For long-distance area measurement, the STM can be adjusted to a long-distance measurement mode by a command given from the base station BTS1 via the control connection 11.

In the long-distance measurement state, the STM is commanded to use a preset timing advance offset in addition to the normal timing advance. The preset timing advance offset shifts the lower limit of the normal timing advance range from zero to the mentioned preset timing advance offset value. Assume as an example that the normal timing advance range is between 0 to 63. Also assume that a value 30 of the preset timing advance offset is used in the long-distance measurement state. The timing advance can thus be adjusted within a range of 30 to 93, which may correspond to distances within a range of 15 to 60 km, for instance.

Figure 4:
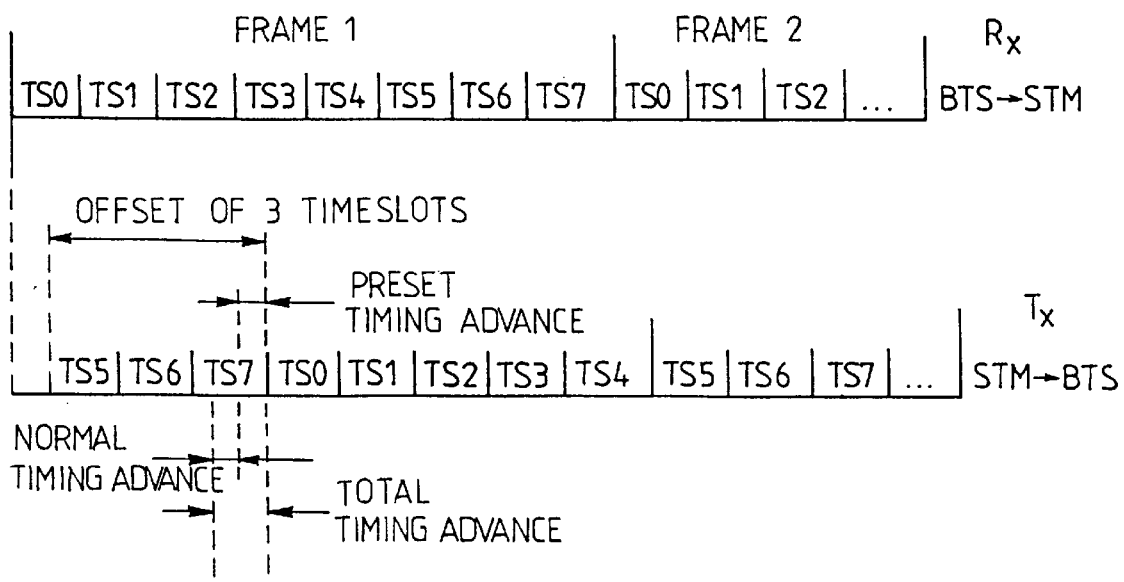
FIG. 4 illustrates the timing of the testing equipment according to the invention in a long-distance area.

The timing of the reception Rx and transmission Tx of the testing equipment STM of the invention in the long-distance measurement mode is illustrated in FIG. 4 To measure a base station BTS, the base station BTS1 adjusts the testing equipment STM to a long-distance measurement state, where the STM uses a preset timing advance offset $TD_{offset}$. At the beginning of the test call, irrespective of whether it is a question of testing a mobile originating call or a mobile terminating call, the STM transmits an access burst to the base station BTS on the random access channel RACH, the timing advance offset value $TD_{offset}$ being used in this access burst instead of the value 0. The base station BTS receives the access burst and determines the distance between the base station and the testing equipment STM in the normal manner. In this determination, the base station BTS assumes, however, that the STM has used the normal timing advance 0 in the transmission of the access burst. The BTS thus estimates the distance of the testing equipment STM to be shorter by the distance according to the preset timing advance offset $TD_{offset}$ than the actual distance is. The BTS then provides the testing equipment STM, by means of downlink signalling, with the normal timing advance value $TD_{normal}$ corresponding to the estimated shorter distance. The STM modifies the normal timing advance value $TD_{normal}$ obtained from the base station BTS by adding the preset timing advance offset value $TD_{offset}$ thereto so that the total timing advance is $TD_{TOT}=TD_{OFFSET}+TD_{NORMAL}$.

Assume, for instance, that $TD_{OFFSET}=30$. The STM uses the timing advance value 30 in the access burst it transmits to the base station BTS2. The base station BTS2 provides the testing equipment STM with a timing advance $TD_{NORMAL}=10$. The STM thus uses the value $TD_{TOT}=30+10=40$ as the connection continues. In this example, the preset timing advance offset was actually not even necessary, a semicolon the normal timing advance area would have been sufficient. The base station BTS2 would thus have actually adjusted, on the basis of the measurement carried out by it, the testing equipment STM to directly use the value 40.

As another example, assume that $TD_{OFFSET}=30$, but the STM transmits an access burst to the base station BTS3. The base station BTS3 provides the testing equipment STM with the normal timing advance value $TD_{NORMAL}=40$. The STM thus uses the timing advance value $TD_{TOT}=30+40=70$ as the connection continues. This testing of the base station BTS3 is possible only because the STM is capable of using excessive timing advance values in the manner according to the invention.

It should be noticed that the timing advance preset of the invention may be remotely controlled instead of having a base station, or, in addition, also some other network element of the radio network controlling the testing operation. Such a network element may be for instance, the base station controller BSC or the operation and maintenance center OMC.

The figures and the description relating thereto are merely intended to illustrate the present invention. It will be apparent that the disclosed testing equipment can be modified and varied without deviating from the scope and spirit of the appended claims.

I claim:

1. A testing equipment for a base station network in a time division multiple access radio system employing time advance control, in which a maximum value defined for a timing advance determines a maximum distance between a base station and a mobile station, comprising:

said testing equipment being located at one base station site which site is under control of a respective base station to perform test procedures on each of a plurality of base stations;

said testing equipment being arranged for simulating operation of a normal mobile station on a respective radio path during said test procedures;

said testing equipment being arranged to shift a normal timing advance range upwards by a preset timing advance when transmitting to a base station having a distance from the testing equipment which is longer than said maximum distance.

2. The testing equipment according to claim 1, wherein: the testing equipment is arranged to use said preset timing advance offset in access bursts.

3. The testing equipment according to claim 2, wherein: the testing equipment is arranged to use a timing advance which is the sum of the timing advance provided by a base station to be tested and said present timing advance offset.

4. The testing equipment according to claim 2, wherein: the value of said preset timing advance offset is zero when the testing equipment is arranged for testing said respective base station or at least one base station neighboring said respective base station.

5. The testing equipment according to claim 2, wherein: the testing equipment is arranged to select at least one value deviating from zero for the preset timing advance offset in order to test base stations located beyond said maximum distance.

6. The testing equipment according to claim 2, wherein: the testing equipment is arranged to have said preset timing advance offset be remotely controlled by a base station or some other network element.

7. The testing equipment according to claim 1, wherein: the testing equipment is arranged to use a timing advance which is the sum of the timing advance provided by a base station to be tested and said present timing advance offset.

8. The testing equipment according to claim 1, wherein: the value of said preset timing advance offset is zero when the testing equipment is arranged for testing said respective base station or at least one base station neighboring said respective base station.

9. The testing equipment according to claim 1, wherein: the testing equipment is arranged to select at least one value deviating from zero for the preset timing advance offset in order to test base stations located beyond said maximum distance.

10. The testing equipment according to claim 1, wherein: the testing equipment is arranged to have said preset timing advance offset be remotely controlled by a base station or some other network element.

11. A testing equipment for a base station network in a time division multiple access radio system employing timing advance control, in which a maximum value defined for a timing advance determines a maximum distance between a base station and a mobile station, comprising:

said testing equipment being located at one base station site in a base station network, which site is under control of a respective base station, to perform test procedures on each of a plurality of base stations;

said testing equipment being arranged for simulating operation of a normal mobile station on a respective radio path during said test procedures;

said testing equipment being arranged to advance a transmission of an access burst to whichever base station is being tested, by a preset timing advance offset, in transmission to the base station being tested, when the testing equipment is setting up a test call to a base station being tested, if the distance of that base station from the testing equipment is longer than said maximum distance;

said testing equipment being arranged to receive a timing advance value determined by the base station being tested in response to said access burst; and said testing equipment being arranged to use as a timing advance for testing the base station being tested, which is the sum of said timing advance received from the base station being tested and said preset timing advance offset, in transmissions subsequent to said access burst to the base station being tested.

* * * * *